May 9, 1933. J. A. OLIVIER 1,907,562
COMPLETELY CONVERTIBLE CAR
Filed May 1, 1930   2 Sheets-Sheet 1
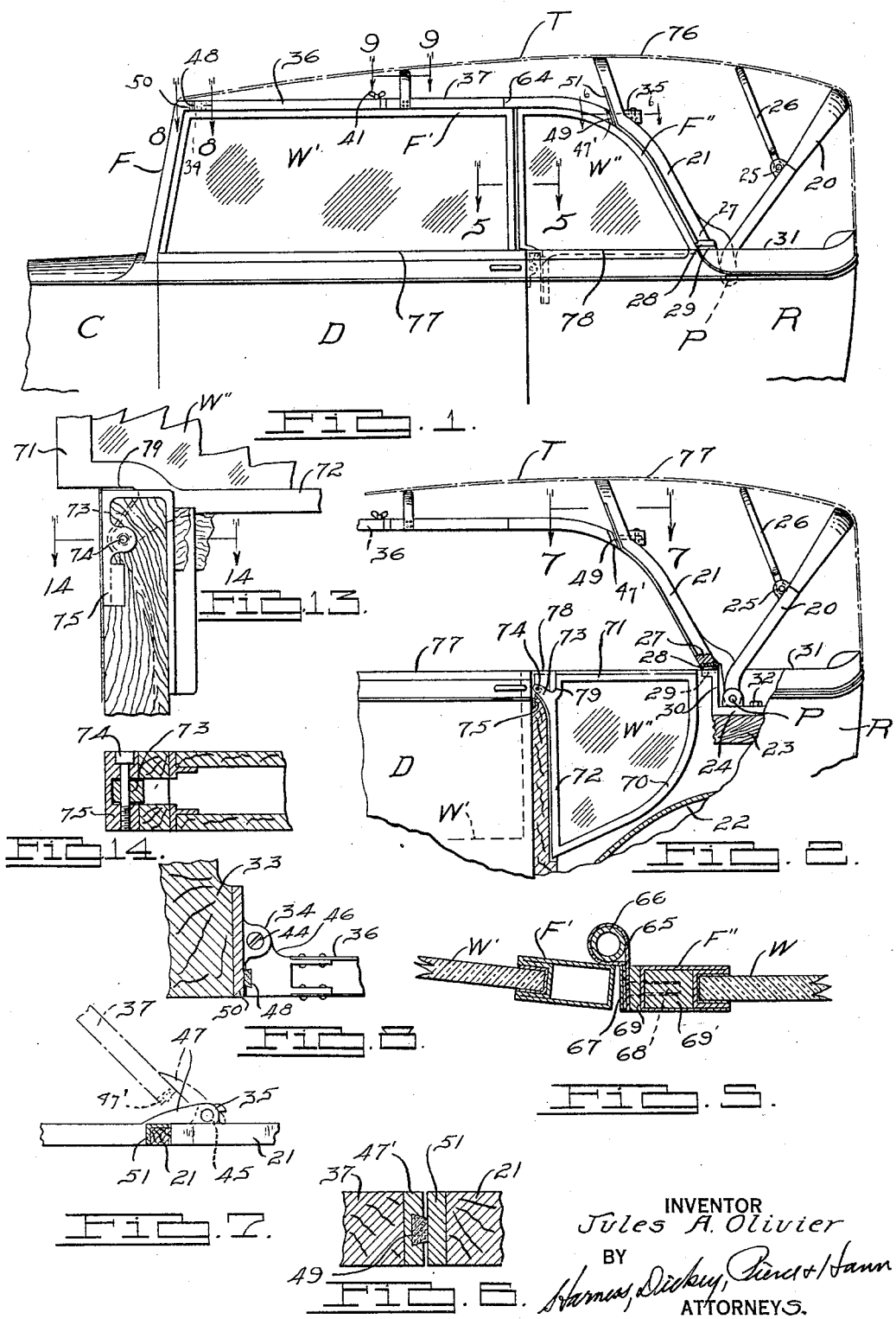

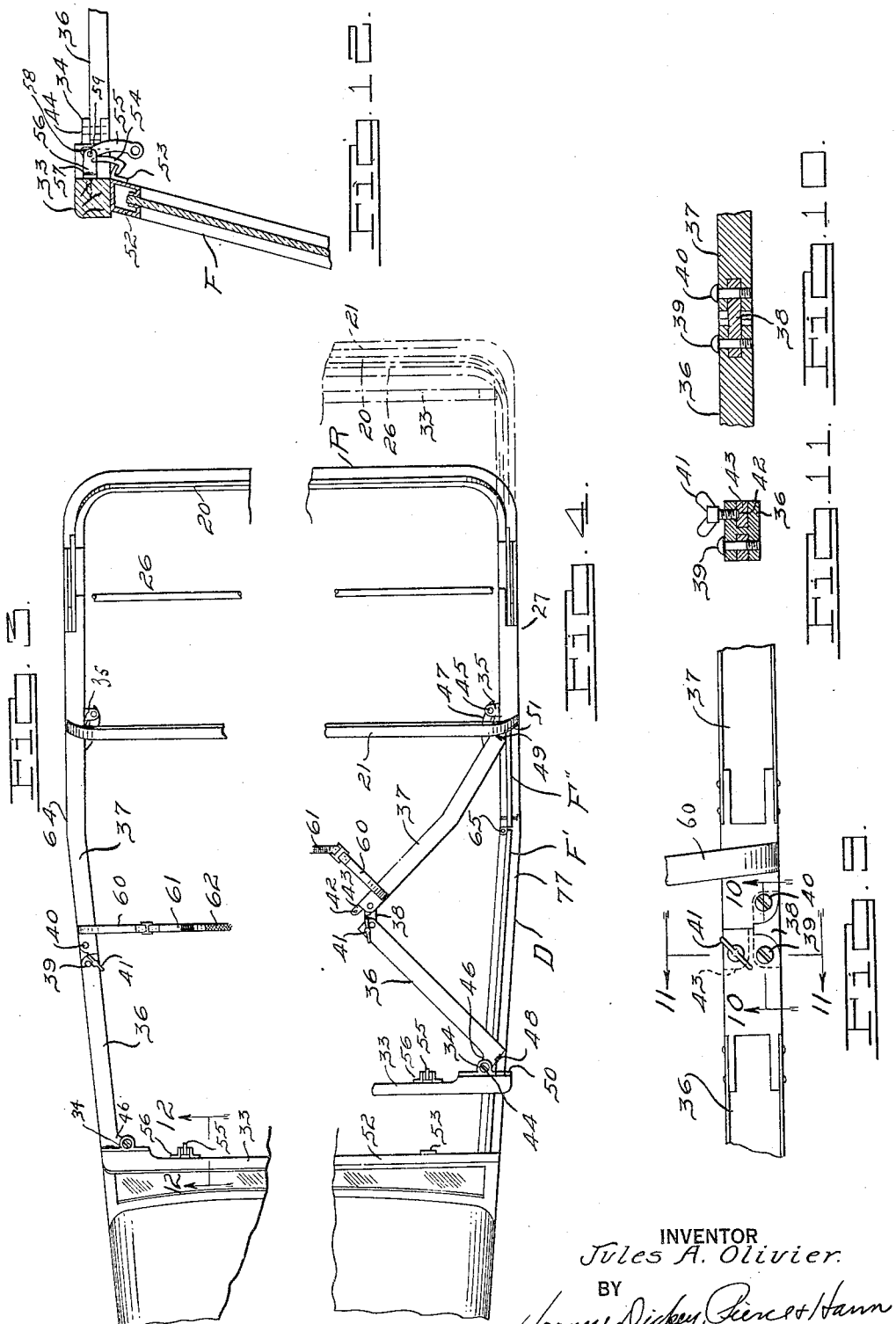

Patented May 9, 1933

1,907,562

UNITED STATES PATENT OFFICE

JULES A. OLIVIER, OF DETROIT, MICHIGAN, ASSIGNOR TO DIETRICH, INCORPORATED, A CORPORATION OF MICHIGAN

COMPLETELY CONVERTIBLE CAR

Application filed May 1, 1930. Serial No. 449,015.

The present invention is referred to as a completely convertible car for the reason that it includes not only a collapsible top, easily foldable to a rearward and out-of-the-way position, but also glass windows which are vertically movable and so shaped as to cooperate with one another and/or with the mentioned top in completely enclosing the interior of the car,—although preferably capable of use even without said top.

It is an object of this invention to provide a car, which may be of so-called touring or phaeton type, with an improved top which is not only collapsible but is of such construction, and of such rigidity when erected, as to cooperate with windshield posts and/or with windshield frame elements in the provision of openings suitable for glass windows; and said top may include, in addition to a plurality of bows pivotally secured to one another or upon common pivots within a rear and quarter section, not only laterally collapsible side frame organizations normally disposed in a common horizontal plane and substantially parallel with the tops of doors at the sides of the car but also a transverse front element adapted to be removably connected in a novel manner with a windshield frame. Frame elements included in said side frame organizations may include or carry a pair or pairs of novel "floating-rib" elements; and these may be resiliently or otherwise terminally interconnected, as by a web or webs, in such a manner as to bias said organizations toward collapse and to provide additional support for any fabric covering material stretched thereover.

It is a further object of the present invention to provide a car, such as a phaeton having a fixed windshield but no fixed top, with doors which contain vertically movable windows,—such as framed windows having inclined front edges adapted to cooperate with similarly inclined posts or frame elements of said windshield; and, in preferred embodiments of the invention, a collapsible top being so formed as to provide an unobstructed and horizontally extending opening which exceeds in length the doors at the sides of the car, vertically movable windows provided in doors and adapted to be employed either with or without a collapsible top may be used in conjunction with additional windows disposed rearwardly thereof and movable to and from a body section or sections.

It is a further object of the present invention to provide, for use either in connection with a fixed top or in connection with a collapsible top or in connection with door-carried windows, novel rear quarter windows. These may be mounted for pivotal movement to and from a rear and quarter panel to which a top is pivoted; and, in preferred embodiments of the invention, said rear quarter windows are provided with frames and are somewhat triangular or trapezoidal in shape,—each frame preferably having two straight sides and also an additional side or sides including a curved portion,—one of said straight sides being suitable for engagement, at times, by a door-carried window and said curved portion being adapted to interfit, at times, with a correspondingly curved bow or other frame element provided by the mentioned top.

Other objects of the present invention, including various features of window construction facilitating support and cooperation in the indicated manner, and also various novel features of top construction and removable attachment, may be best appreciated from the following description of an illustrative embodiment of the invention, taken in connection with the appended claims and the accompanying drawings.

Fig. 1 is a side elevational view of a car provided with one embodiment of the present invention, some parts being eliminated and other parts being broken away, and windows being shown in their upper or closed position.

Fig. 2 is a view similar to Fig. 1, but showing some parts as differently broken away, and the windows as lowered.

Fig. 3 is a half top plan view with parts broken away and with top frame elements shown as in a completely erected position.

Fig. 4 is a view similar to Fig. 3, but showing in dotted lines the folded or collapsed position of the top and showing in full lines a step or stage in the erection or the collapse of the top.

Fig. 5 is a horizontal sectional detail view, taken substantially as indicated by the line 5—5 of Fig. 1.

Fig. 6 is a similar sectional view, taken substantially as indicated by the line 6—6 of Fig. 1.

Fig. 7 is a similar sectional view, taken substantially as indicated by the line 7—7 of Fig. 2.

Fig. 8 is a similar sectional view, taken substantially as indicated by the line 8—8 of Fig. 1.

Fig. 9 is a similar sectional view, taken substantially as indicated by the line 9—9 of Fig. 1.

Figs. 10 and 11 are respectively vertical sectional views taken substantially as indicated by the lines 10—10 and 11—11 of Fig. 9.

Fig. 12 is a vertical sectional detail view taken substantially as indicated by the line 12—12 of Fig. 3.

Fig. 13 is an enlargement of a portion of Fig. 2, but with parts differently broken away and with a rear quarter window elevated.

Fig. 14 is a horizontal sectional view, taken as indicated by the line 14—14 of Fig. 13.

Referring first to certain general features of the selected embodiment, in Figs. 1 and 2 comparatively long half-height doors D, preferably hinged at their forward edges, are shown as extending between a cowl section C and a rear and quarter section R and as rising only to the top of the latter; and a complete top T is shown as of "one-man" type and as pivoted at P to said rear and quarter section and extending forward substantially parallel with the tops of the doors D and into engagement with the frame F of a windshield W. Side openings, surrounded by the mentioned members, may be closed by means such as door-carried windows W' and seat-side or quarter windows W",—respectively provided with frames F' and F"; and the present invention should be understood to relate particularly to features of the top T adapting it to cooperate with these windows, to features adapting said windows to be used either with or without said top, to features adapting said windows to cooperate with one another and with the windshield, and to features adapting said windows to disappear respectively within said doors and said rear and quarter section.

Referring first to preferred details of the rear portion of the top T, a rigid rear bow 20 and a rigid intermediate bow 21 are both shown as secured to the pivots P at opposite sides of a seat-sides section in the form of a rear and quarter panel R,—comprising or receiving a wheel housing 22 and shown as containing a frame element 23 to support a pivot bracket 24; the rear bow 20 is shown as having pivotally secured thereto, at 25, a subsidiary bow 26; and the intermediate bow 21 is shown as provided with an offset, at 27, adapted to serve as a stop in limiting the forward swing of the bow 21 relative to the top edge of the panel R during and after the erection of the top T. At the offset 27, each end of the bow 21 may be provided with a reinforcing plate 28; and a slight cushioning effect, in addition to a squeak-obviating effect and/or a further reinforcing effect, may be obtained by the use of slightly upstanding rubber or other slightly yielding inserts 29, retained by means such as subsidiary brackets 30. These may extend downward into engagement with the pivot brackets 24 and upwardly terminate at the level of top edge 31 of the panel R; or they may be formed in one piece with said pivot brackets and retained by means such as screws or bolts 32 extending into frame element 23.

In case the top T is to be forwardly elongated suitably for use upon a phaeton, rather than upon a roadster or any form of landaulet, in preference to connecting the bow 21 by means of forwardly extending arms with a front transverse element, inwardly collapsible side frame organizations of a novel design may be employed. For example, a transversely extending front frame element provided near its respective ends with pivot bosses 34, and pivot bosses 35 extending inwardly from the bow 21, may be interconnected by laterally collapsible organizations comprising frame elements 36 and 37,—the latter being, in turn, secured together by means permitting either a pivotal movement therebetween or a locking of the same in substantial alignment.

As best shown in Figs. 4, 9, 10 and 11, an inserted plate 38 may be secured to the adjacent ends of the frame members 36 and 37 by means such as vertical rivets, pivot pins, bolts or screws 39, 40; and means such as a thumb screw 41, adapted to enter a depression 42 in an extending portion 43 of the frame element 37 (or of a plate receiving hinge member thereon) may be employed releasably to lock the members 36 and 37 in the relationship in which they are shown in Fig. 3,—adapting the top to be finally secured to the windshield frame F by any suitable means. Vertical pins 44, 45 being inserted through bosses 34 and 35 and through offset brackets or portions 46 and 47, and said bosses and offsets being respectively provided by or upon the remote ends of the frame elements 36 and 37, outward movement of said frame elements during erection of the top T may be limited in any suitable way,—as by end contacts or by engagement of slightly yieldable rubber or other inserts 48, 49 secured in the ends of the frame elements 36 and 37 and adapted to engage reinforcing plates 50, 51 secured respectively upon the transverse frame element 33 and upon the bow 21.

A top element 52 of the windshield frame F is shown as carrying a keeper 53 near each end thereof; and the transverse frame element 33 may carry corresponding latch devices of a novel type. Each of these may include a hook element 54, for engagement with one of the mentioned keepers, having pivoted thereto a weighted or other handle 55. Said handle may, in turn, be so pivoted to a bracket or brackets 56 secured upon the transverse frame element 33, as by means of screws 57, that pivot pins 58 and 59 may be brought into substantial alignment with hook 54 and held therein by a so-called toggle effect and/or by action of gravity.

It will be understood from the foregoing that when side frame organizations, preferably including the interconnected but inwardly movable elements 36 and 37, have been substantially or completely straightened out (and preferably locked in their outer positions) a vehicle user by whom the mentioned movements have been affected may secure the front edge of the top to the windshield in the described manner; and the elongated openings thus provided below said top may obviously either be left open or closed by means of suitable windows; and it will be obvious also that the side frame elements 37 and/or other side frame elements may be interconnected by means providing an additional support or supports disposed forwardly of the bowl 21 or its equivalent.

For example, each horizontal frame element 37 may be provided with a so-called floating-rib 60 rigidly connected thereto and curved inwardly at the top thereof; and the tops of some or all of these floating-ribs may be resiliently or otherwise interconnected by means comprising light webbing elements 61,—elastic or having interposed between the adjacent ends thereof a section of elastic webbing 62. This construction may be such as to obviate all necessity for its tension thereto during erection or collapse of the top T, and such as to enable the so-called floating-ribs 60 to obtain some protection from the upper portion of the intermediate bow 21 when the top is collapsed; and it will be seen that withdrawal of the pins P enables the entire top when folded back to be removed at will,—as for purposes of repair or replacement.

Figs. 6 and 7 will be seen to suggest that the rearward end of the side frame elements 37 be, in each instance, provided with a reinforcement including not only the offset pivot bracket 47 but also a plate 47 adapted to receive the mentioned cushioning stop elements 49. As suggested in Fig. 7 the pivot-carrying boss 45 may, in each instance, be formed integral with a mentioned reinforcing plate 51, disposed opposite said cushioning stop element; and the windows W' and W" may not only be shaped to interfit but provided with metallic reinforcements in the form of the mentioned frames F' and F",—these preferably having the general character suggested in Fig. 5, and the contours suggested in Figs. 1 and 2.

Each window W', movable by known means in a substantially vertical plane to and from a position of concealment within a door D, will be seen to occupy when in its elevated position, or to be capable of occupying, the entire space between an upright post or frame element of the windshield W and a rear quarter window W",—in case the latter is employed therewith; and not only forward lateral frame elements 37 but adjacent portions of the frame elements 36, also substantially horizontal may be adapted to cooperate with an upper element of each frame F' when the windows W' occupy their elevated positions and the top is in use; but it will be seen that each window W' may cooperate advantageously with the windshield W whether or not a top and/or a rear quarter window W" is used therewith; and each window W", no matter how secured, may advantageously include not only a frame F", adapted to interfit beneath frame elements of the top T, but also crack-closing yieldable stop means,—such as a cushioning organization comprising a strip 65. This is shown as enclosing a rubber tube 66 and as retained by a plate 67 and a screw 68, extending through reinforcing elements 69 and 69',—this organization being positioned at the forward edge of a window W", when the latter is elevated, in such a manner as to close a crack between the windows W' and W" and to provide for a mutual reinforcing effect.

The frames F' and F" preferably extend entirely around the respective door-carried and seat-side windows W' and W"; and they may be respectively comprised in means for the support and/or manipulation of said windows. For example, each window W" being shown as provided with not only an outwardly rounded edge enclosed in a curved side element 70, adapting it to interfit above the housing 22 when said window is lowered and to interfit beneath the bow 21 when said window is raised, each frame F" may include also straight elements 71 and 72; and the latter may include an inclined offset or arm 73 apertured to receive a horizontal pivot pin 74,—the latter being shown as extending also through an opening or openings in a bracket or brackets 75, carried by a door jamb flange or by an adjacent frame element of the rear and quarter section or panel R. This construction is intended to provide for vertical movement in such a manner as to permit the window W" to be concealed within said panel when said window occupies its lowered position.

It will be seen that any of the glass or other rigid window elements W, W' and W", all being shown and referred to as preferably surrounded by metallic frames of channel type, may be used without the others; that one, two, three or four of the vertically movable windows W', W" may be used with the windshield W; that adjacent edges of any of the mentioned parts may cooperate for, or be provided with, means for a crack-closing or a reinforcing effect, although the relationships therebetween are not such as to subject the windows to any avoidable or harmful wracking by the action of wind upon the fabric covering 76 of the top T; and that, assuming an upper edge 77 of each door D (whose window W' may in each case be guided and manipulated by interior known means, not shown) to lie substantially the same plane with an adjacent edge 31 of a seat-side panel such as the panel R, in order to enable each window W" to extend slightly over the top of the adjacent door D and to cooperate in an indicated manner with a window W', each window W" and its frame F" may be notched, as at 79, adjacent its pivot arm 73. Each window W" may be swung up and down, in a substantially vertically plane, either by concealed means engaging some part on or of its frame or by a direct manual engagement of the bead provided by the crack-closing and cushioning elements 65, 66,—accessible at the top of a slot at the top of panel R even after the window W" has been lowered therethrough.

The half-height doors D being preferably secured, as by piano type hinges, adjacent a cowl section carrying windshield W and cooperating with sections R in providing openings for said doors, the top edges of said doors naturally come at a level below that of the top of said windshield,—to which the windows W' and W" may rise, in the planes thereof, in order completely or partially to close the window openings bounded by mentioned members and by top T.

The functions of all parts having been indicated in connection with the foregoing description, it may be emphasized, in conclusion, that although the foregoing description has included complete details of but one embodiment of the present invention, various features thereof, such as details of the top construction and the pivoting of a window near the upper front corner of a body section, might be independently employed; and emphasized also that numerous modifications, additional to any suggested herein, could be easily devised by skilled workers if informed of the foregoing,—all without departure from the scope of the present invention, as the latter is indicated above and in the following claims.

What I claim is:

1. An automotive vehicle including, in combination, a body section provided with a window well and a collapsible top, and a pivoted window in the plane of the side of the top carried by said section and shaped to interfit with said top and to be movable to a position within said well irrespective of the position of said top.

2. An automotive vehicle including, in combination, a body section provided with a window well and a folding top, and a pivoted window in the plane of the side of the top carried by said section and shaped to interfit with said top and to be movable within said well when the top is in raised and in lowered position.

3. An automotive vehicle including, in combination, a body section having a foldable top, a window in the plane of the side of the top carried by said section and shaped to interfit said top, and pivoted means for permitting the movement of said window to and from said top when the top is in raised position.

4. An automotive vehicle including, in combination, a body section having a well for receiving a window, a window pivoted for movement to and from said well, and a top for said body section having the sides thereof in the plane of said window and provided with a window opening closable by said window when pivotally moved from said well.

5. In an automotive vehicle, the combination with a body section having a window receiving well therein, a door on said body section, a window slidable in said door and extensible thereabove, a collapsible top for said body, and a window in said well in the plane of the sides of said top and extensible thereabove and projectable over said door for engagement with said door window.

6. In an automotive vehicle, the combination with a body section having a door and a top provided thereon, a slidable window in said door, and a pivoted window on said body section so disposed when in raised position to be in aligned position with the sides of the top and also the edge of the raised door window to form a closure for the body section.

JULES A. OLIVIER.